US011803048B2

(12) United States Patent
Erdl et al.

(10) Patent No.: US 11,803,048 B2
(45) Date of Patent: Oct. 31, 2023

(54) LIGHTING DEVICE FOR A MOTOR VEHICLE

(71) Applicant: Bayerische Motoren Werke Aktiengesellschaft, Munich (DE)

(72) Inventors: Helmut Erdl, Flintsbach (DE); Abdelmalek Hanafi, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 261 days.

(21) Appl. No.: 17/437,532

(22) PCT Filed: May 13, 2020

(86) PCT No.: PCT/EP2020/063247
§ 371 (c)(1),
(2) Date: Sep. 9, 2021

(87) PCT Pub. No.: WO2020/234063
PCT Pub. Date: Nov. 26, 2020

(65) Prior Publication Data
US 2022/0146817 A1 May 12, 2022

(30) Foreign Application Priority Data
May 21, 2019 (DE) .................... 10 2019 113 406.4

(51) Int. Cl.
G02B 26/00 (2006.01)
G02B 26/10 (2006.01)
(Continued)

(52) U.S. Cl.
CPC ......... *G02B 26/101* (2013.01); *B60Q 1/0023* (2013.01); *F21S 41/141* (2018.01);
(Continued)

(58) Field of Classification Search
CPC . G02B 26/101; G02B 26/0858; F21S 41/675; F21S 41/141; B60Q 1/0023; G03B 21/2033
See application file for complete search history.

(56) References Cited

U.S. PATENT DOCUMENTS

2009/0015388 A1    1/2009 Yagi et al.
2011/0249460 A1*  10/2011 Kushimoto ........... F21S 41/141
                                            362/509
(Continued)

FOREIGN PATENT DOCUMENTS

CN    103574473 A    2/2014
CN    104736388 A    6/2015
(Continued)

OTHER PUBLICATIONS

Chinese-language Office Action issued in Chinese Application No. 202080022004.3 dated Nov. 15, 2022 with English translation (18 pages).
(Continued)

Primary Examiner — Gerald J Sufleta, II
(74) Attorney, Agent, or Firm — Crowell & Moring LLP

(57) ABSTRACT

A lighting device for a motor vehicle includes a first light source for producing visible light and a MEMS scanner in which a single tiltable mirror is integrated. A light spot, which is generated by the lighting device at a distance from the latter, can be moved by a scanning movement of the mirror. A control apparatus is provided in the lighting device and can be used to operate the lighting device in a first mode of operation. The control apparatus is further configured to operate the lighting device in a second mode of operation. Moreover, a sensor apparatus is provided, such that in the second mode of operation, the apparatus detects as sensor data light radiation which originates from the surroundings of the motor vehicle and which is incident on the mirror. The (Continued)

control apparatus carries out object recognition by way of evaluation of the sensor data.

20 Claims, 1 Drawing Sheet

(51) Int. Cl.
*F21S 41/675* (2018.01)
*F21S 41/141* (2018.01)
*B60Q 1/00* (2006.01)
*G02B 26/08* (2006.01)

(52) U.S. Cl.
CPC ........ *F21S 41/675* (2018.01); *G02B 26/0858* (2013.01); *B60Q 2300/45* (2013.01)

(56) References Cited

U.S. PATENT DOCUMENTS

| 2012/0250137 | A1 | 10/2012 | Maxik et al. | |
|---|---|---|---|---|
| 2014/0029280 | A1* | 1/2014 | Suckling | F21S 41/255 362/510 |
| 2014/0029282 | A1 | 1/2014 | Ravier et al. | |
| 2015/0285457 | A1* | 10/2015 | Erdl | F21S 41/36 362/513 |
| 2017/0357004 | A1 | 12/2017 | Puente et al. | |
| 2018/0120424 | A1 | 5/2018 | Eshel et al. | |
| 2018/0215309 | A1 | 8/2018 | Reinprecht | |
| 2018/0264990 | A1* | 9/2018 | Mouri | F21S 41/675 |
| 2019/0293253 | A1* | 9/2019 | Erdl | F21S 41/675 |
| 2021/0086691 | A1* | 3/2021 | Plank | H04N 9/3164 |

FOREIGN PATENT DOCUMENTS

| CN | 107110454 A | 8/2017 |
|---|---|---|
| DE | 10 2008 054 801 A1 | 6/2010 |
| DE | 10 2017 203 892 A1 | 9/2018 |
| EP | 3 090 900 A1 | 11/2016 |
| WO | WO 2018/162222 A1 | 9/2018 |

OTHER PUBLICATIONS

International Search Report (PCT/ISA/210) issued in PCT Application No. PCT/EP2020/063247 dated Aug. 10, 2020 with English translation (six (6) pages).

German-language Written Opinion (PCT/ISA/237) issued in PCT Application No. PCT/EP2020/063247 dated Aug. 10, 2020 (11 pages).

German-language Search Report issued in German Application No. 10 2019 113 406.4 dated Jan. 18, 2020 with partial English translation (13 pages).

\* cited by examiner

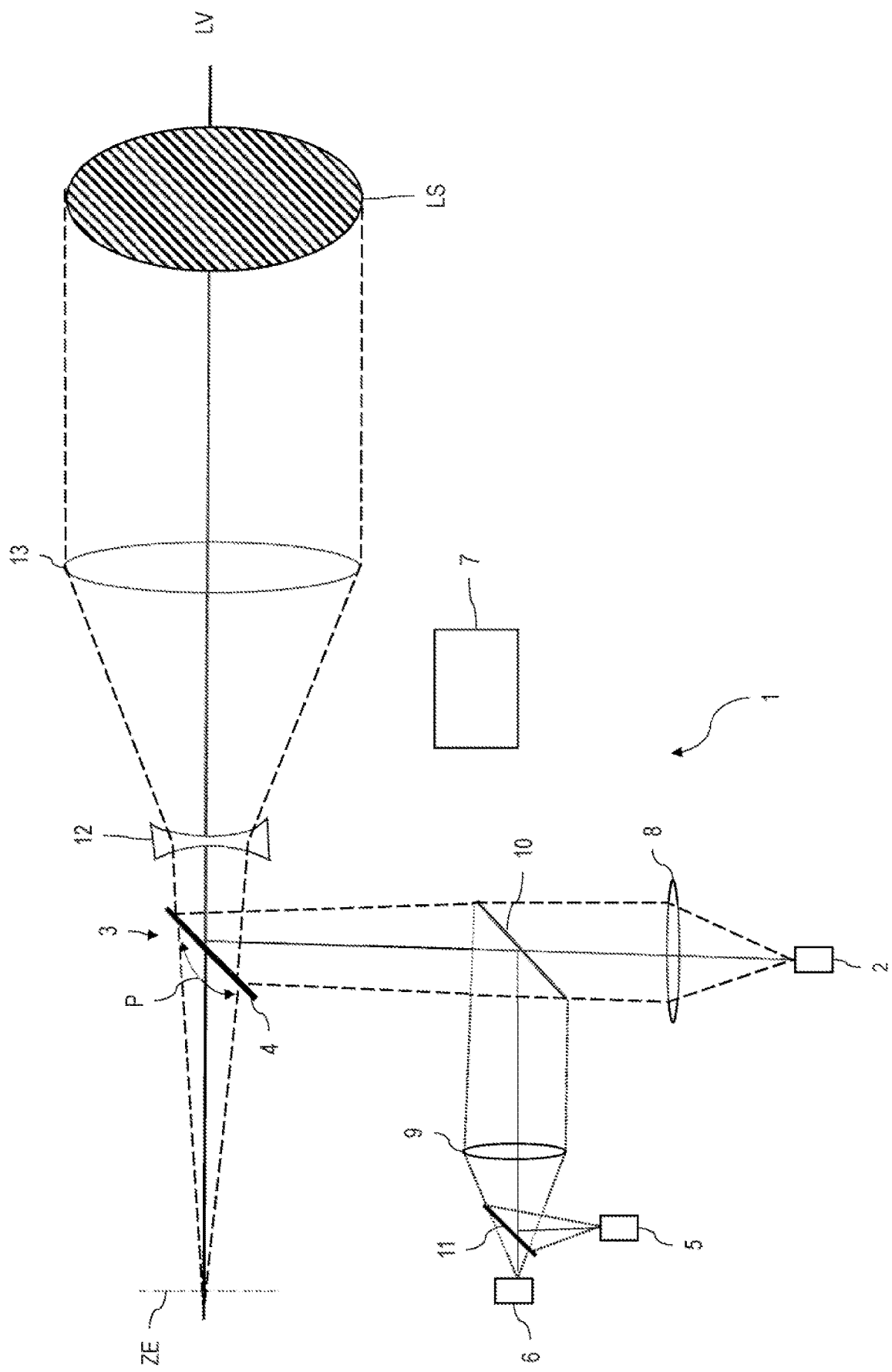

LIGHTING DEVICE FOR A MOTOR VEHICLE

BACKGROUND AND SUMMARY OF THE INVENTION

The invention relates to an illumination apparatus for a motor vehicle and to a corresponding motor vehicle.

The prior art discloses the use of a scanning illumination apparatus in a motor vehicle, in which one or more light beams from a light source are deflected via a scanning movement and a light spot is moved thereby in order to generate a predetermined light distribution, such as a low beam. MEMS (micro-electromechanical system) scanners, in which the corresponding light beams are deflected via a continuously movable mirror that is integrated in a semiconductor chip, are frequently used in such illumination apparatuses.

Document WO 2018/162222 A1 discloses an illumination apparatus having a MEMS scanner, which is operated as a vector scanner. During this operation, the scanning movement of the mirror installed therein is varied to run across only illuminated regions of the light distribution in this way.

Scanning illumination apparatuses having MEMS scanners enable the generation of light distributions with high light intensities but do not provide any operating modes for sensing the environment of the motor vehicle.

It is therefore the object of the invention to provide an illumination apparatus for a motor vehicle having a MEMS scanner that carries out a sensor function in addition to an illumination function.

This object is achieved by the illumination apparatus according to the claimed invention.

The illumination apparatus according to embodiments of the invention is intended for integration in a motor vehicle. Where interactions between the illumination apparatus or components of the illumination apparatus and the motor vehicle or its environment are described in the following text and in particular in the patent claims, this should always be understood to mean that the interaction occurs when the illumination apparatus is arranged or installed in the motor vehicle. The components of the illumination apparatus that exhibit a corresponding interaction with the motor vehicle or its structural parts or its environment are thus designed such that the interaction is brought about when the illumination apparatus is arranged or installed in the motor vehicle.

The illumination apparatus according to embodiments of the invention comprises a first light source for producing visible light and a MEMS scanner containing a MEMS device having a semiconductor chip, in which an individual tiltable mirror is integrated, wherein a light spot generated by the illumination apparatus at a distance therefrom can be moved via a scanning movement of the mirror, during which the mirror is continuously tilted. MEMS devices are known per se from the prior art. In one preferred variant, the mirror has, in plan view, a maximum extent of between 1 mm and 6 mm. For tilting the mirror in the MEMS device, an actuator system that is known per se can be used, for example an electrostatic and/or magnetic actuator system and/or a piezo actuator system. Due to the feature of continuous tilting and the use of an individual mirror, the MEMS scanner used in an embodiment of the invention differs from digital light modulators composed of micromirrors, in which the mirrors can adopt only two discrete positions.

In the illumination apparatus according to an embodiment of the invention, a control apparatus with which the illumination apparatus can be operated in a first operating mode, in which the light spot is generated from light of a switched-on first light source and the MEMS scanner performs a vector scan in order to produce a prescribed light distribution by way of the movement of the light spot, is provided. The vector scan is characterized here in that the scanning movement of the mirror is varied in dependence on the prescribed light distribution in a manner such that the light spot runs over each contiguous region in the light distribution in the case of a continuously switched-on first light source. In other words, during the vector scan, the light spot remains substantially continuously switched on. Only if a plurality of contiguous regions that are separate from one another are present in the light distribution is it possible for the first light source and thus for the light spot to be switched off for a short time in order to switch between the regions. By operating the MEMS scanner in a vector scan, a light distribution with a high illuminance can be produced. Depending on the design of the illumination apparatus according to an embodiment of the invention, different light distributions can be generated, for example on the ground in the environment of the motor vehicle. The light distribution preferably comprises a prescribed light pattern and/or a symbol in the form of text and/or graphic elements.

The illumination apparatus according to an embodiment of the invention is characterized in that the control device is configured to operate the illumination apparatus in a second operating mode, in which the MEMS scanner performs a raster scan, during which the mirror performs linear movements (that is to say straight-line movements) that are offset with respect to one another at a fixed oscillation frequency as a scanning movement. The first light source is preferably switched off in this second operating mode. Furthermore, a sensor device is provided, which is designed such that, in the second operating mode, it captures as sensor data light radiation that is coming from the environment of the motor vehicle and is incident on the mirror. The control device is furthermore designed such that it performs object detection by evaluating the sensor data. This object detection is deactivated in the first operating mode in one variant of the illumination apparatus according to the invention. In this case, the sensor device is preferably also deactivated. The term control device here and below is to be understood in broad terms. In particular, the control device does not have to be an individual control unit, but the functions of the control device can be distributed over a plurality of units.

The illumination apparatus according to an embodiment of the invention has the advantage that a light distribution with a high luminance can be generated easily via a vector scan using a MEMS scanner. At the same time, a sensor function is provided in the raster scan operation of the MEMS scanner by which sensor data of a large section of the environment of the motor vehicle can be captured. Moreover, a compact construction of the illumination apparatus is achieved by using a MEMS device. Furthermore, it may be possible that a calibration of the sensor device is performed by way of the first light source because the first light source and the sensor device interact with the same MEMS scanner.

In one variant of the illumination apparatus according to the invention, no light at all is emitted by the illumination apparatus in the second operating mode. Rather, the environment of the motor vehicle is detected merely passively by the sensor device. In a further configuration of the illumination apparatus according to the invention, the first light source or a second light source (which differs from the first light source) is switched on in the second operating mode in order to generate the light spot and to move it by way of the raster scan of the MEMS scanner. In this case, light that is coming from the light spot, is reflected back to the illumination apparatus through interaction with the environment and is incident on the mirror is captured by the sensor device as at least part of the sensor data. In this way, active detection of the environment of the motor vehicle is achieved. In the second operating mode, preferably either the first light source or the second light source (if present) is switched on. Nevertheless, it is not ruled out that both light sources are switched on in the second operating mode.

Preferably, the second light source of the just described embodiment is configured to produce light in the non-visible spectrum, in particular infrared light, and thereby a non-visible light spot. In this way, the process of the detection of the environment around the motor vehicle is not visible to a human observer. In one preferred variant of this embodiment, the sensor device is configured only for the detection of the non-visible light produced by the second light source.

In a further preferred embodiment, the first light source and/or the second light source and/or the further light source described further below is in each case an LED light source composed of one or more LEDs or possibly is a laser light source composed of one or more laser diodes. Equally, the abovementioned second light source can also be an LED light source or a laser light source.

In a particularly preferred variant of the above embodiment, the first light source and/or the second light source and/or the further light source is in each case an RGB light source. If the first or second or third light source is an LED light source, the RGB light source comprises a red LED, a green LED, and a blue LED. If the first or second or further light source is a laser light source, it comprises a red laser diode, a green laser diode, and a blue laser diode.

In a further preferred configuration, the first light source, the MEMS scanner, and the sensor device are installed in a common housing, with the result that essential integral parts of the illumination apparatus are contained in a compact light module. It may also be possible for the control device and/or the second light source and/or the further light source described further below to be integrated in this module.

In a further variant of the invention, the control device is configured to operate the illumination apparatus in a third operating mode, in which the MEMS scanner performs a raster scan, during which, similarly to the above raster scan, the mirror performs linear movements that are offset with respect to one another at a fixed oscillation frequency as a scanning movement. The third operating mode is characterized in that the first light source or a further light source (different from the first light source), which produces visible light, is switched on in order to generate the light spot and to move it by way of the raster scan of the MEMS scanner in order to produce a predetermined light distribution. The predetermined light distribution is thus generated by a raster scan, in contrast to the prescribed light distribution. The illuminance of this light distribution is here generally lower than during the vector scan because the corresponding light source is always temporarily deactivated if the scanning movement is currently running over a dark region, in which no light distribution is to be generated. In the third operating mode, preferably either the first light source or the further light source (if present) is switched on. Nevertheless, it is not ruled out that both light sources are switched on in the third operating mode.

If appropriate, the further light source of the above embodiment can correspond to the above-described second light source, provided the latter generates visible light. Under certain circumstances, the second and the third operating mode can coincide, meaning that both a sensor function with object detection and an illumination function are realized in the raster scan of the MEMS scanner. Likewise, merely an illumination function may be provided in the third operating mode. In this case, the object detection of the control device and possibly also the operation of the sensor device are deactivated in the third operating mode.

In a further preferred embodiment, the control device is designed such that it places the illumination apparatus from an inactive state into an operating state, in particular into the first or second or third operating mode, when a signal that is generated in the motor vehicle and triggered by the approach of a person toward the motor vehicle is received. This signal can be triggered for example in a manner known per se by the detection of an access token in the manner of a contactless key, wherein the access token is carried by the person approaching the motor vehicle. The access token allows the person to operate the motor vehicle. The access token can possibly also represent a mobile radio device, such as for example a smartphone.

In one preferred variant of the above embodiment, the control device is designed such that it initially places the illumination apparatus into the second operating mode when the signal is received, until it detects the approaching person by way of the object detection by evaluating the sensor data, whereupon the control device places the illumination apparatus into the first or third operating mode to produce the prescribed or predetermined light distribution. The light distribution is here preferably generated on the ground adjacent to the approaching person. In this way, an appealing welcome scenario for the approaching person can be accomplished.

In a further embodiment, the control device is designed such that it can detect, as part of the object detection, a mobile radio device in the environment of the motor vehicle, wherein, upon detection of a mobile radio device, the control device aligns the mirror of the MEMS scanner with the mobile radio device such that light radiation that is coming from the mobile radio device including information that is contained therein is received by the sensor device. The sensor device is here designed such that it reads the information from the light radiation and processes it further. The received light radiation is preferably light radiation in the non-visible spectrum, in particular infrared light radiation. With this embodiment, the illumination apparatus also carries out the function of receiving communication signals. A mobile radio device is understood to mean any portable device that can communicate in a mobile radio network. In particular, the mobile radio device is a mobile telephone, in particular a smartphone or a tablet or a laptop.

In one preferred variant of the above embodiment, the information contained in the light radiation comprises image data describing an image. The control device is here designed such that it operates the MEMS scanner in the first operating mode or the third operating mode as part of the further processing in a manner such that the image is produced as a prescribed or predetermined light distribution, preferably on the ground in the environment of the motor vehicle. With this variant of the illumination apparatus according to the invention, a personalized representation of a light distribution based on the information of a mobile radio device can be accomplished. Preferably, an app is installed on the mobile radio device via which the user can specify which image data are to be transmitted to the illumination apparatus.

In a further embodiment, the control device is designed such that it can detect, by way of the object detection, a person who is looking in the direction of the illumination apparatus. During the detection of such a person, the control device reduces the light output of the first light source and possibly also of the second and/or further light source during the operation thereof. In this way, damage to the person's eyes caused by the light from the corresponding light source is avoided.

The illumination apparatus according to an embodiment of the invention can, depending on the embodiment, carry out different functions in the motor vehicle. In one variant, the illumination according to the invention comprises a vicinity illumination device to generate the prescribed light distribution in the vicinity of the motor vehicle. The vicinity of the motor vehicle is here understood to be the region at a distance of at most 50 m from the installation position of the illumination apparatus in the motor vehicle. In a further variant, the illumination apparatus according to the invention comprises a headlight, which is configured to generate, as the prescribed light distribution, a low beam and/or a high beam distribution. The illumination apparatus according to an embodiment of the invention can likewise comprise a vehicle signaling lamp, in particular a taillight and/or a brake light. The vehicle signaling lamp is configured to produce a signal function by way of the prescribed light distribution.

In addition to the above illumination apparatus, the invention furthermore relates to a motor vehicle comprising one or more illumination apparatuses according to an embodiment of the invention or one or more preferred variants of these illumination apparatuses.

One exemplary embodiment of the invention will be described in detail below with reference to the attached FIG. 1.

BRIEF DESCRIPTION OF THE DRAWING

FIG. 1 shows a schematic illustration of an embodiment of an illumination apparatus according to the invention.

DETAILED DESCRIPTION OF THE DRAWING

One variant of the invention will be explained below with reference to a motor vehicle illumination apparatus, which serves as a vicinity illumination device and can generate light distributions on the ground around the motor vehicle in the close range of up to 15 m. In particular, a symbol, such as for example a graphic or a logo, or another predetermined light pattern can be produced here as the light distribution.

The illumination apparatus 1 of FIG. 1 comprises an RGB light source 2 comprising three semiconductor diodes exhibiting a red, green, and blue emission. The semiconductor diodes can also be conventional LEDs and possibly also laser diodes, depending on the embodiment. Using the light source 2, visible light in the form of white light is generated, wherein by suitable actuation of the semiconductor diodes it is also possible to produce light in another color in the visible spectrum. The light source 2 corresponds to a first light source within the meaning of the patent claims.

The beam path of the visible light from the light source 2 is indicated in FIG. 1 by dashed lines, which identify the boundary of the light beam coming from the light source 2. The light from the light source 2 travels through a collimator lens 8 and a beam splitter 10 and is finally incident on a MEMS scanner 3, which comprises an individual tiltable mirror 4, wherein the tilting of the mirror is indicated by the double-headed arrow P. The MEMS scanner 3 is a MEMS device that is known per se, in which the mirror 4 is integrated in a semiconductor chip.

After the mirror 4, the light beam coming from the light source 2 is incident on an exit optical unit comprising a concave lens 12 and a collimator lens 13. The collimator lens 8 produces a virtual image in the intermediate image plane ZE that appears as a light spot LS on the ground in the environment of the motor vehicle. With a suitable scanning movement of the mirror 4, the light spot LS can be moved quickly on the ground, as a result of which a desired light distribution LV can be generated, which is not illustrated in more detail in FIG. 1.

The illumination apparatus 1 in FIG. 1 comprises a further light source 5, which corresponds to a second light source within the meaning of the patent claims. In the exemplary embodiment described here, this light source produces infrared light. The light source 5 is preferably an LED light source having one or more infrared LEDs. The light from this light source 5 is directed, via a beam splitter 11 and a collimator lens 9, to the beam splitter 10. This beam path is indicated in FIG. 1 by dotted lines, which show the boundary of the corresponding light beam. After the beam splitter 10, the beam path of the light coming from the light source 5 corresponds to the beam path of the light coming from the light source 2, which is reproduced by way of dashed lines. Accordingly, the light radiation of the light coming from the light source 5 likewise travels to the mirror 4 of the MEMS scanner 3, whereby a light spot LS is again generated, which, however, is now not visible for an observer on account of the infrared light source 5 being used.

The illumination apparatus in FIG. 1 furthermore comprises a sensor device 6, with which only infrared light can be detected in the embodiment described here. The sensor device 6 preferably comprises one or more photodiodes. The infrared light that passes, as a light spot, into the environment and is reflected back from there to the illumination apparatus 1 is detected with the sensor device 6 in the case of the light source 5 being switched on. This light travels to the sensor device 6 in the opposite direction of the beam path of the light coming from the light source 5 via the beam splitter 11.

The illumination apparatus 1 in FIG. 1 further comprises a control device 7, which controls the operation of the light sources 2 and 5 and of the MEMS scanner 3 and can receive sensor data of the sensor device 6, as will be explained in more detail below. The components illustrated in FIG. 1 are integrated, except for the control device 7, in a common housing and form a light module in this sense. The control device is connected to the light sources 2, 5, the sensor device 6, and the MEMS scanner 3 via communication lines (not shown). The control device may optionally comprise a plurality of separate devices or units.

The illumination apparatus in FIG. 1 is characterized in that the MEMS scanner 3 can be operated both as a vector scanner and as a raster scanner. During operation as a vector scanner, the light distribution LV is generated by the light source 2, whereas the operation as a raster scanner is used to capture sensor data of the environment of the motor vehicle by way of the sensor device 6. The operation of the MEMS scanner 3 as a vector scanner corresponds to a first operating mode of the illumination apparatus 1, and the operation of the MEMS scanner 3 as a raster scanner corresponds to a second operating mode of the illumination apparatus 1. By using these two types of operation, a light distribution with a high illuminance can be generated and additionally sensing of the environment around the motor vehicle can be achieved.

In the first operating mode, in which the light source 2 is switched on to generate the light distribution LV, the tiltable mirror 4 is actuated by the control device 7 such that the scanning movement of the mirror is varied in dependence on the generated light distribution in a manner such that the light spot LS runs over each contiguous region of the light distribution in the case of the continuously switched-on light source 2. Consequently, it does not run over a fixedly prescribed pattern, but rather, the pattern is varied such that the light spot during a scanning movement always points at positions in the light distribution that should actually be illuminated. Only if the light distribution comprises a plurality of spatially separated regions is the light source 2 switched off for a short time to jump between these regions. With this vector scan, the output of the light source 2 is optimally utilized because the light source is operated substantially continuously. As a result, a light distribution with a high illuminance can be generated.

In addition to the first operating mode, the illumination apparatus in FIG. 1 can also be operated in the second operating mode, in which a raster scan is performed by the MEMS scanner 3. In the embodiment of FIG. 1, the light source 2 is switched off in the second operating mode and, instead, the infrared light source 5 is switched on. At the same time, the MEMS scanner is operated as a raster scanner. This means that the mirror 4 performs, based on control signals of the control device 7, linear movements that are offset with respect to one another at a fixed oscillation frequency as a scanning movement, that is to say the scanning movement is not varied, in contrast to the vector scan. With this raster scan, a non-visible light spot is generated. In this case, the light radiation of the light spot reflected back by the environment is captured via the sensor device 6. In this way, sensor data providing an image of that region of the environment over which the raster scan runs are obtained. These sensor data are provided to the control device 7, which then performs object detection using algorithms that are known per se. Depending on the configuration of the object detection, different types of objects can be detected and, based thereon, specific actions can be initiated by the control device 7. This object detection is preferably performed only in the second operating mode (that is to say not in the first operating mode). Consequently, the sensor device 6 can be deactivated in the first operating mode, if appropriate.

In a preferred variant, the illumination apparatus 1 is used to generate what is known as a welcome scenario. The starting point of this scenario is a parked motor vehicle that the driver approaches. The driver in this case carries an access token in the form of a contactless key, wherein the motor vehicle detects the presence of the contactless key using methods that are known per se, and consequently it is detected that the driver is moving toward the motor vehicle. As a consequence, the illumination apparatus 1, which is initially in the inactive state, is activated, wherein first the above-described second operating mode is switched on, in which the environment is sensed by way of the sensor device 6 via the raster scan of the MEMS scanner 4 and no visible light distribution is generated. By evaluating the sensor data, the control device 7 detects the position of the approaching driver. As a consequence, the illumination apparatus 1 is switched by the control device 7 into the first operating mode, in which the light source 2 is switched on and the MEMS scanner 3 is operated as a vector scanner. As a result, the prescribed light distribution LV on the ground is generated. The position of the light distribution can be controlled here, in dependence on the approaching person, such that the light distribution moves with the approaching person or is located directly in front of the approaching person. The light distribution can include a symbol, for example in the form of a logo or of another graphic. In this way, an appealing light scenario is provided for the driver approaching their motor vehicle.

In a further embodiment, the control device 7 can detect, in the second operating mode, a mobile radio device in the environment of the motor vehicle by way of the object detection. As soon as such a mobile radio device is detected, the control device aligns the mirror 4 of the MEMS scanner 3 with the mobile radio device, that is to say the mirror is brought into a fixed position and the raster scan is terminated. Subsequently, infrared light radiation emitted by the mobile radio device, including the information contained therein, can be received by the sensor device 6. In one preferred embodiment, this information contains image data. These image data are read by the control device 7, which subsequently operates the MEMS scanner in the first operating mode such that the image described by the image data is presented as a prescribed light distribution LV on the ground in the vicinity of the motor vehicle.

Preferably, an app is installed on the mobile radio device allowing the user to select a desired image that is to be reproduced as the light distribution. The image data corresponding to this image are then emitted by the mobile radio device via infrared light radiation and can be received by the sensor device 6, whereupon the desired image is produced as a light distribution LV by way of the control device 7.

In a further configuration of the illumination apparatus in FIG. 1, the control device 7 can also detect, by way of the object detection in the second operating mode, a person who is looking in the direction of the illumination apparatus. In this case, the light output of the light source 2 is reduced during a subsequent first operating mode so as to avoid damage to the eyes, which is relevant in particular if the light source 2 is a laser light source.

In a further variant of the illumination apparatus according to the invention, it is also possible that a visible light spot is moved by a raster scan of the MEMS scanner 3. In other words, a visible light distribution may also be produced via a raster scan. In this case, the illumination apparatus is operated in a third operating mode, in which the light source 2 is switched on and the MEMS scanner performs a raster scan. In order to produce a desired light distribution by way of the raster scan, the light source 2 is operated such that it is switched on only if, owing to the raster scan, a position is adopted that corresponds to an illuminated point in the light distribution. This leads to an efficiency loss during the generation of the light distribution, but higher-resolution light distributions can be produced. For example, it is possible that the raster scan is used to produce a light distribution in the dark, because in this case, lower illuminances are sufficient. By contrast, the vector scan is used with higher ambient brightness because higher illuminances are required here to make the light distribution visible against the ambient brightness.

The embodiment of the invention described above has a number of advantages. In particular, a MEMS scanner that can perform both an illumination function by way of a vector scan and a sensor function by way of a raster scan is used in a motor vehicle illumination apparatus. In this way, high illuminance of the light distribution produced by means of the vector scan is achieved, wherein at the same time the use of the raster scan ensures a large sensed area. Moreover, the use of the MEMS scanner enables a compact construction of the illumination apparatus. In particular, essential components of the illumination apparatus can be installed in a common light module.

LIST OF REFERENCE SIGNS

1 Illumination apparatus
2 First light source
3 MEMS scanner
4 Mirror
5 Second light source
6 Sensor device
7 Control device
8, 9, 12, 13 Lenses
10, 11 Beam splitter
LS Light spot
LV Light distribution
ZE Intermediate image plane

What is claimed is:

1. An illumination apparatus for a motor vehicle, the illumination apparatus comprising:
    a first light source for producing visible light;
    a MEMS scanner comprising a MEMS device having a semiconductor chip, wherein an individual tiltable mirror is integrated in the MEMS device, and a light spot that is generated by the illumination apparatus at a distance from the illumination apparatus is movable via a scanning movement of the mirror, during which the mirror is continuously tilted;
    a sensor device; and
    a control device with which the illumination apparatus operable in a first operating mode in which the light spot is generated from light from a switched-on first light source and the MEMS scanner performs a vector scan in order to produce a prescribed light distribution by way of movement of the light spot, wherein:
    the scanning movement of the mirror in the vector scan is varied in dependence on the prescribed light distribution such that the light spot runs over each contiguous region in the prescribed light distribution when the first light source is continuously switched-on,
    the control device is configured to operate the illumination apparatus in a second operating mode in which the MEMS scanner performs a raster scan in which the mirror performs linear movements that are offset with respect to one another at a fixed oscillation frequency as a scanning movement,
    the sensor device is configured such that the sensor device captures, in the second operating mode, light radiation that comes from an environment of the motor vehicle and is incident on the mirror as sensor data, and
    the control device is further configured to perform object detection by evaluating the sensor data.

2. The illumination apparatus according to claim 1, wherein:
    the illumination apparatus is configured such that the first light source or a second light source is switched on in the second operating mode in order to generate the light spot and to move the light spot by way of the raster scan of the MEMS scanner, and
    light coming from the light spot that is reflected back to the illumination apparatus through interaction with the environment and is incident on the mirror is captured by the sensor device as at least part of the sensor data.

3. The illumination apparatus according to claim 2, wherein the second light source is configured to produce light in a non-visible spectrum.

4. The illumination apparatus according to claim 3, wherein the light is infrared light.

5. The illumination apparatus according to claim 1, wherein the first light source is an LED light source composed of one or more LEDs, or a laser light source composed of one or more laser diodes.

6. The illumination apparatus according to claim 1, wherein the first light source is an RGB light source composed of a red LED, a green LED, and a blue LED, or a laser light source comprised of a red laser diode, a green laser diode, and a blue laser diode.

7. The illumination apparatus according to claim 1, wherein the first light source, the MEMS scanner, and the sensor device are installed in a common housing.

8. The illumination apparatus according to claim 1, wherein:
    the control device is configured to operate the illumination apparatus in a third operating mode in which the MEMS scanner performs a raster scan, in which the mirror performs linear movements that are offset with respect to one another at a fixed oscillation frequency as a scanning movement, and
    the first light source or a further light source producing visible light is switched on in the third operating mode in order to generate the light spot and to move the light spot by way of the raster scan of the MEMS scanner in order to produce a predetermined light distribution.

9. The illumination apparatus according to claim 8, wherein the control device is configured such that, when a signal that is generated in the motor vehicle triggered by the approach of a person toward the motor vehicle is received, the control device places the illumination apparatus from an inactive state into an operating state, in particular into the first or second or third operating mode.

10. The illumination apparatus according to claim 9, wherein the operating state is the first operating mode, the second operating mode, or the third operating mode.

11. The illumination apparatus according to claim 9, wherein the control device is configured such that the control device initially places the illumination apparatus into the second operating mode when the signal is received, until it detects the person by way of the object detection by evaluating the sensor data, whereupon the control device places the illumination apparatus into the first or third operating mode in order to produce the prescribed light distribution.

12. The illumination apparatus according to claim 9, wherein the prescribed light distribution is produced on a ground adjacent to the person.

13. The illumination apparatus according to claim 1, wherein:
    the control device is configured to detect, as part of the object detection, a mobile radio device in the environment of the motor vehicle,
    upon detection of the mobile radio device, the control device aligns the mirror of the MEMS scanner with the mobile radio device such that light radiation coming from the mobile radio device, including information contained in the light radiation is received by the sensor device, and
    the control device is configured to read the information from the light radiation and further process the information.

14. The illumination apparatus according to claim 13, wherein:
    the information contained in the light radiation comprises image data describing an image, and
    the control device is configured to operate the MEMS scanner as part of the further processing in the first or third operating mode such that the image is produced as the prescribed light distribution.

15. The illumination apparatus according to claim 14, wherein the prescribed light distribution is produced on a ground in the environment of the motor vehicle.

16. The illumination apparatus according to claim 1, wherein:
   the control device is configured to detect, by way of the object detection in the second operating mode, a person who is looking in a direction of the illumination apparatus, and
   upon detection of the person, the control device reduces a light output of the first light source during an operation.

17. The illumination apparatus according to claim 1, further comprising a vicinity illumination device in order to generate the prescribed light distribution in a vicinity of the motor vehicle.

18. The illumination apparatus according to claim 1, further comprising a headlight which is configured to generate at least one of a low beam distribution or a high beam distribution as the prescribed light distribution.

19. The illumination apparatus according to claim 1, further comprising a vehicle signaling lamp which is configured to produce a signal function by way of the prescribed light distribution.

20. A motor vehicle comprising one or more illumination apparatuses according to claim 1.

* * * * *